United States Patent [19]

Koide et al.

[11] 4,214,309
[45] Jul. 22, 1980

[54] NUMERICAL CONTROLLER FOR CONTROLLING MACHINING OF OVAL WORKPIECE

[75] Inventors: Tsuyoshi Koide, Toyota; Yasuji Oda, Kariya, both of Japan

[73] Assignee: Toyoda-Koki Kabushiki-Kaisha, Aichi, Japan

[21] Appl. No.: 956,231

[22] Filed: Oct. 31, 1978

[30] Foreign Application Priority Data

Nov. 8, 1977 [JP] Japan .................................. 52/134452

[51] Int. Cl.² ............................................... B23B 1/00
[52] U.S. Cl. ................................. 364/474; 51/97 NC; 51/165.71; 318/573; 364/107
[58] Field of Search ............................... 364/107, 474; 51/165.71, 97 NC, 105 R; 318/567, 569, 570, 571, 573, 600

[56] References Cited

U.S. PATENT DOCUMENTS

| | | | |
|---|---|---|---|
| 3,344,559 | 10/1967 | In aba et al. | 51/105 R |
| 3,482,357 | 12/1969 | Inaba et al. | 51/105 R |
| 4,025,764 | 5/1977 | Tack | 51/165.71 |
| 4,061,907 | 12/1977 | Okamoto et al. | 318/573 |
| 4,079,235 | 3/1978 | Froyd et al. | 364/474 |

Primary Examiner—Errol A. Krass
Attorney, Agent, or Firm—Oblon, Fisher, Spivak, McCelland & Maier

[57] ABSTRACT

A numerical controller having a memory device for storing a profiling program composed of a series of data blocks, each of which designates an incremental rotational amount of an oval workpiece and an incremental feed amount of a tool slide, and a digital computer for reading out the data blocks one by one from the memory device when no rough grinding is instructed, so as to provide, based upon a read-out data block, interpolation data of feed pulses which are to be distributed for tool slide feed in connection with feed pulses to be generated for workpiece rotation. In rough grinding, the digital computer reads out a predetermined number of the data blocks and accumulates profiling data included therein so as to provide interpolation data based upon the accumulated profiling data, thereby shortening processing time for providing the interpolation data in rough grinding.

5 Claims, 4 Drawing Figures

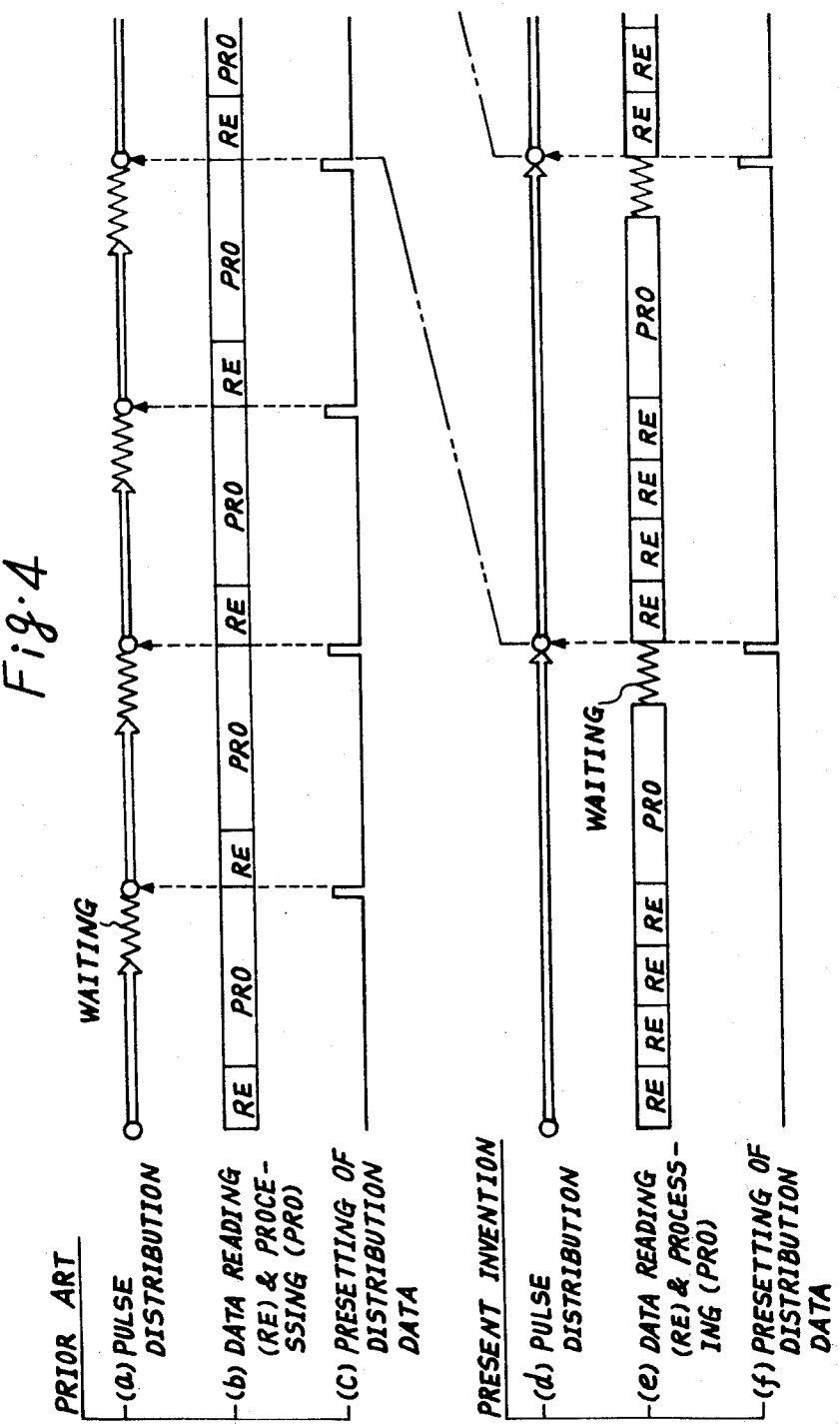

NUMERICAL CONTROLLER FOR CONTROLLING MACHINING OF OVAL WORKPIECE

BACKGROUND OF THE INVENTION

1. Field of the Invention

The present invention relates to a numerical controller for controlling a machine tool to machine a workpiece to a desired oval form, in accordance with a profiling program.

2. Description of the Prior Art

In a numerical controller for controlling the machining of an oval workpiece such as an automotive cam, generally data corresponding to the feed amount of a tool slide per unit angle rotations of the workpiece are programmed on a block-by-block basis, and as a series of profiling data blocks, are stored in a memory device prior to a machining operation. The profiling data blocks are successively read out from the memory device respectively when the unit angle rotations of the workpiece are effected, and an infeed amount through which the tool slide is to be infed in accordance with a feed sequence program during each unit angle rotation of the workpiece is added to a feed amount included in each of the read-out profiling data blocks. Each of the profiling data blocks, after such addition, is then subjected to a pulse interpolation processing so as to derive interpolation data, so that by effecting a pulse distribution operation in accordance with the interpolation data, there can be performed a numerical control to machine a workpiece to a desired oval form.

The reading-out of each of the profiling data blocks and the data processings for addition of the infeed amount to the read-out profiling data as well as for interpolation operation are performed in a parallel time relation, as shown in (a) and (b) of FIG. 4, with a pulse distribution operation executed in accordance with interpolation data which was calculated in a previous cycle. In a grinding process wherein the speed of pulse distribution is as fast as that in rough grinding, however, the reading-out of each profiling data block and the data processing are completed after the termination of a pulse distribution, as a result of the considerable time of duration thereof, and this makes it impossible for the prior art numerical controller to increase the speed of pulse distribution and to thereby enhance the machining efficiency in a rough grinding operation.

Particularly, in a so-called "computerized numerical controller" incorporating a general purpose digital computer of a small capacity type, a maximum speed of pulse distribution is constrained to a considerably low value due to the fact that data processing steps for addition of the infeed amount, interpolation operation and the like, take much time during execution by means of software, and that data processing steps for feed rate overriding control, speed-up and slow-down control, the calculation of a present position and the like must be executed each time the workpiece is rotated a unit rotational angle. By way of example, in the case where the data processing for a pulse distribution is executed upon each occurrence of a 0.1 degree rotation of the workpiece, so as to cause a grinding machine to perform a cam profiling motion, it was impossible to increase the rotational speed of the workpiece in rough grinding by more than 3 r.p.m.

Further, there may be considered another method, wherein a profiling program for rough grinding is prepared including a series of data blocks which are one-quarter or one-fifth of those of the above-noted profiling program for fine grinding and wherein a pulse distribution in rough grinding is executed in accordance with the profiling program for rough grinding. In this method, since the number of the read-outs and data processing steps which are executed concerning the profiling data during one rotation of the workpiece is decreased, it is possible to increase the pulse distribution speed in rough grinding and, accordingly, the workpiece rotational speed. However, the method not only necessitates providing in the memory device a data area for storing the profiling program for rough grinding, independently of that for storing the profiling program for fine grinding, but also necessitates preparing the profiling program for rough grinding, thus making the program preparation time consuming, complicated and troublesome.

SUMMARY OF THE INVENTION

Accordingly, it is a primary object of the present invention to provide an improved numerical controller capable of increasing the pulse distribution speed in rough machining of an oval workpiece.

Another object of the present invention is to provide an improved numerical controller capable of controlling rough machining of an oval workpiece in accordance with a profiling program equally suitable for fine machining.

A further object of the present invention is to provide an improved numerical controller of the character set forth above, which prior to each of pulse distribution operations in rough machining, is capable of reading out a predetermined number of data blocks of a profiling program from a memory device, of accumulating profiling data included in the predetermined number of data blocks, and of processing the accumulated profiling data as one data block, for each of the pulse distribution operations.

Briefly, according to the present invention, there is provided a numerical controller which comprises a memory device for storing a profiling program composed of a series of data blocks, a data processing device for reading out a successive one of the data blocks from the memory device and for processing profiling data included in the successive one of the data blocks so as to provide interpolation data of a first train of feed pulses to be distributed in connection with a second train of feed pulses, and a pulse distribution circuit for applying the second and first trains of the feed pulses respectively to first and second servomechanisms which respectively effect rotation of a workpiece and feed movement of a tool slide toward and away from the workpiece so as to machine the workpiece to a predetermined oval form in accordance with the profiling program. The numerical controller is characterized by the data processing device, which successively reads out a predetermined number of data blocks of the series of the data blocks from the memory device after ascertaining that the workpiece is in rough machining. Further, the data processing device accumulates profiling data included in the predetermined number of the data blocks and provides the interpolation data based upon the accumulated profiling data.

In the numerical controller, the time that is taken for data processing per data block is shortened since in rough machining, the data reading-out and processing for a pulse distribution operation is executed once for the predetermined number of the data blocks. Therefore, it is possible to increase the pulse distribution speed in rough machining, so that the same can be completed within a short period of time. Moreover, since the profiling program prepared for use in fine machining is useable also in rough machining by accumulating the profiling data included in the predetermined number of the data blocks, the necessity of preparing a profiling program for exclusive use in rough machining in addition to a program prepared for use in fine machining is advantageously avoided.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, in which:

FIG. 4 is a time chart for explaining a time relation between pulse distributions and data processing steps.

DETAILED DESCRIPTION OF A PREFERRED EMBODIMENT

Figure 1:
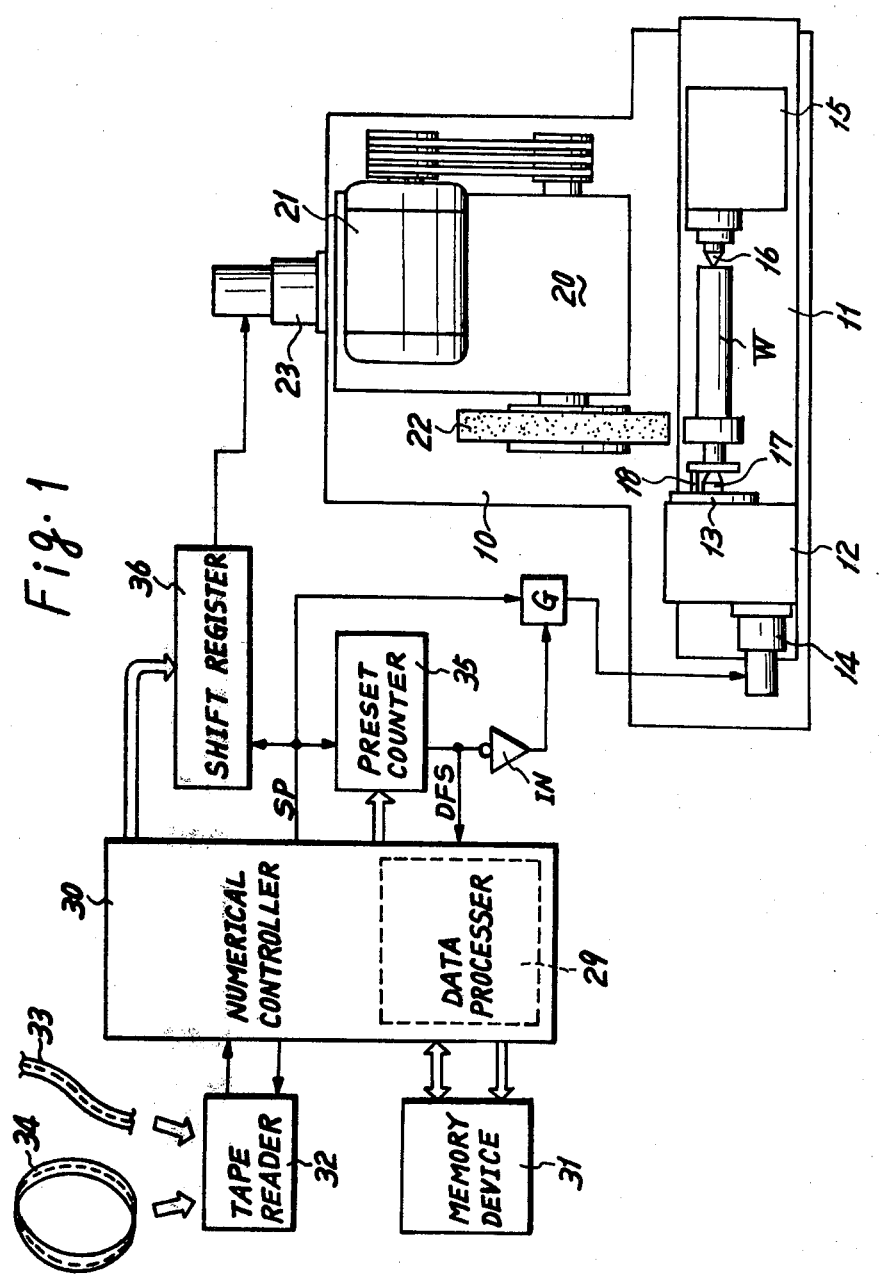
FIG. 1 is a schematic view of a numerically controlled machine tool system having a numerical controller according to the present invention.

Referring now to the drawings and particularly, to FIG. 1 thereof, a numerically controlled grinding machine is shown comprising a bed 10, on which is slidably guided a table 11, on the left-hand end of which a workhead 12 is in turn mounted. The workhead 12 has rotatably carried therein a work spindle 13, which is in connection to a servomotor 14 so as to be rotated thereby. The table 11 has also mounted on a right-hand end thereof a tail stock 15, whose center 16 cooperates with a center 17 of the work spindle 13 so as to rotatably carry therebetween a workpiece $\overline{w}$, which is driven by the work spindle 13 through a driving member 18. A tool slide 20 is slidably guided on a rear portion of the bed 10 for movement toward and away from the workpiece $\overline{w}$, and a grinding wheel 22, rotatably supported as a tool on the tool slide 20, is in connection to be rotated by a motor 21. The tool slide 20 is connected to a servomotor 23 through a feed screw, not shown, so that advance and retraction movements of the tool slide 20 is effected by the servomotor 23.

Indicated at 30 is a numerical controller, which is composed primarily of a small-scale general purpose digital data processor 29, such as a so-called "mini-computer". The data processor 29 is programmed to distribute feed pulses to the servomotors 14 and 23 in accordance with both of a profiling program being stored in a memory device 31 and a machining sequence program included in a sequence tape 33 readable by a tape reader 32. More specifically, input data included in the sequence program is added to feed data which is included in the profiling program for effecting a profiling motion of the tool slide 20, and interpolation operations for pulse distribution to the servomotor 23 are executed based upon resultant feed data obtained by such addition.

The profiling program being stored in the memory device 31 defines displacements of the tool slide (x-axis) 22 relative to respective angle rotations of the work spindle (c-axis) 13 and, as shown in Table 1, is composed of a series of data blocks, each of which includes an incremental unit rotational amount of the work spindle 13 and an incremental feed amount of the tool slide 20 per incremental unit rotational amount. A profiling tape 34, carrying the profiling program, is read by the tape reader 32 under the control of the numerical controller 30 in advance of numerical control operations, so that the profiling program is stored in the memory device 31.

TABLE 1

| PROFILING PROGRAM | | |
|---|---|---|
| Block No. | C-axis | X-axis |
| 1 | C10 | X + 1 |
| 2 | C10 | X + 2 |
| 3 | C10 | X + 2 |
| 4 | C10 | X + 3 |
| 5 | C10 | X + 4 |
| : | : | : |
| : | : | : |
| 3597 | C10 | X − 3 |
| 3598 | C10 | X − 2 |
| 3599 | C10 | X − 1 |
| 3600 | C10 | X − 1 |

TABLE 2

| MACHINING SEQUENCE PROGRAM | | |
|---|---|---|
| Block No. | Data | Meaning |
| 1 | S100X-20000F 1000 | Work spindle rotational speed: 10 r.p.m. Total infeed amount: 20000 pulses Infeed amount per work spindle revolution: 2000 pulses |
| 2 | S10X-1000F 200 | Work spindle rotational speed: 1 r.p.m. Total infeed amount: 1000 pulses Infeed amount per work spindle revolution: 200 pulses |
| 3 | S10X-100F 10 | Work spindle rotational speed: 1 r.p.m. Total infeed amount: 100 pulses Infeed amount per work spindle revolution: 10 pulses |

As indicated in TABLE 2, the sequence tape 33 has carried thereon three data blocks, which respectively define a rotational speed of the work spindle, a total infeed amount of the tool slide, and an infeed rate of the tool slide. Data included in these three data blocks is used to respectively define a rough grinding, a fine grinding and a finish grinding. Since the rotational speed of the tool spindle 13 in the rough grinding is faster than those in the fine and finish grindings, it is possible by referring to the work spindle rotational speed included in each of the three data blocks to ascertain whether the workpiece $\overline{w}$ is in the rough grinding operation. The numerical controller 30 or the data processor 29, in this particular embodiment is programmed to judge, in the foregoing manner, whether the workpiece $\overline{w}$ is in the rough grinding operation. The processor 29 is further programmed to read out the data blocks of the profiling program from the memory device 31 four by four in the rough grinding and, for the purpose of each pulse distribution operation, to process data included in the read-out four data blocks as if they are data included in one data block.

Further, a preset counter 35 and a shift register 36 are provided in order for the numerical controller 30 to simultaneously execute a pulse distribution operation and the data processing for a successive pulse distribution operation. The function of the preset counter 35 is to count reference pulses SP which are applied from the numerical controller 30 to the servomotor 14 through a gate G and whose generation cycle corresponds to the work spindle rotational speed programmed in each data block of the sequence program. The preset counter 35 is preset, as an initial value, with data indicative of the incremental unit rotational amount of the work spindle 13, which is included in each data block of the profiling program, and when having its content reduced to zero, applies a distribution completion signal DFS so as to inform the numerical controller 30 of the completion of a pulse distribution operation which is executed in accordance with each data block of the profiling program, as well as to close the gate G. The data processor 29 is responsive to the distribution completion signal DFS so as to output the data indicative of the incremental unit rotational amount to the preset counter 35 for presetting therein.

The shift register 36 serves to temporally store pattern data of feed pulses to be distributed to the servomotor 23. The data processor 29 adds an infeed amount through which the tool slide 20 is to be displaced while the workpiece $\overline{w}$ is rotated the incremental unit rotational amount (10 pulses), to a feed amount of the tool slide 20 that is programmed in each data block of the profiling program, and processes the resultant feed amount, obtained by such addition, so as to provide pattern data of feed pulses which are to be distributed to the servomotor 23 in connection with feed pulses to be output to the servomotor 14. The data processor 29 is further operable to preset the pattern data of feed pulses into the shift register 36 in response to the distribution completion signal DFS. The pulse pattern data is composed of a combination such as, for example, "1001001001" of signals "1" and "0" and has bits which correspond in number to the incremental unit rotational amount preset in the preset counter 35. Thus, when the pulse pattern data is preset in the shift register 36, a chain of feed pulses, coinciding with the pulse pattern data, are output from the shift register 36 in synchronism with the reference pulses SP applied from the numerical controller 30 and are supplied to the servomotor 23. This causes the servomotor 23 to rotate smoothly, so that the surface of the workpiece $\overline{w}$ is smoothly ground.

In the rough grinding, the data processor 29 reads out data blocks of the profiling program from the memory device 31 four by four each time a pulse distribution operation is completed; in other words, each time it receives the pulse distribution completion signal DFS from the preset counter 35, and processes data of the read-out four data blocks as if they are data of one data block, so as to provide pulse pattern data for a successive distribution operation. Further, the sum "40" of the incremental unit rotational amounts of the work spindle 13 which are included in the read-out four data blocks is preset in the preset counter 35 each time a pulse distribution operation is completed, and simultaneously with this, the pulse pattern data for the four data blocks is preset in the shift register 36. The pulse pattern data is obtained by adding an infeed amount through which the tool slide 20 is to be infed in accordance with the sequence program while the work spindle 13 is rotated in accordance with the read-out four data blocks, to the sum "40" of the incremental rotational amounts of the four data blocks and by processing the total feed amount obtained by such addition, in a known processing method for pulse interpolation.

Figure 2:
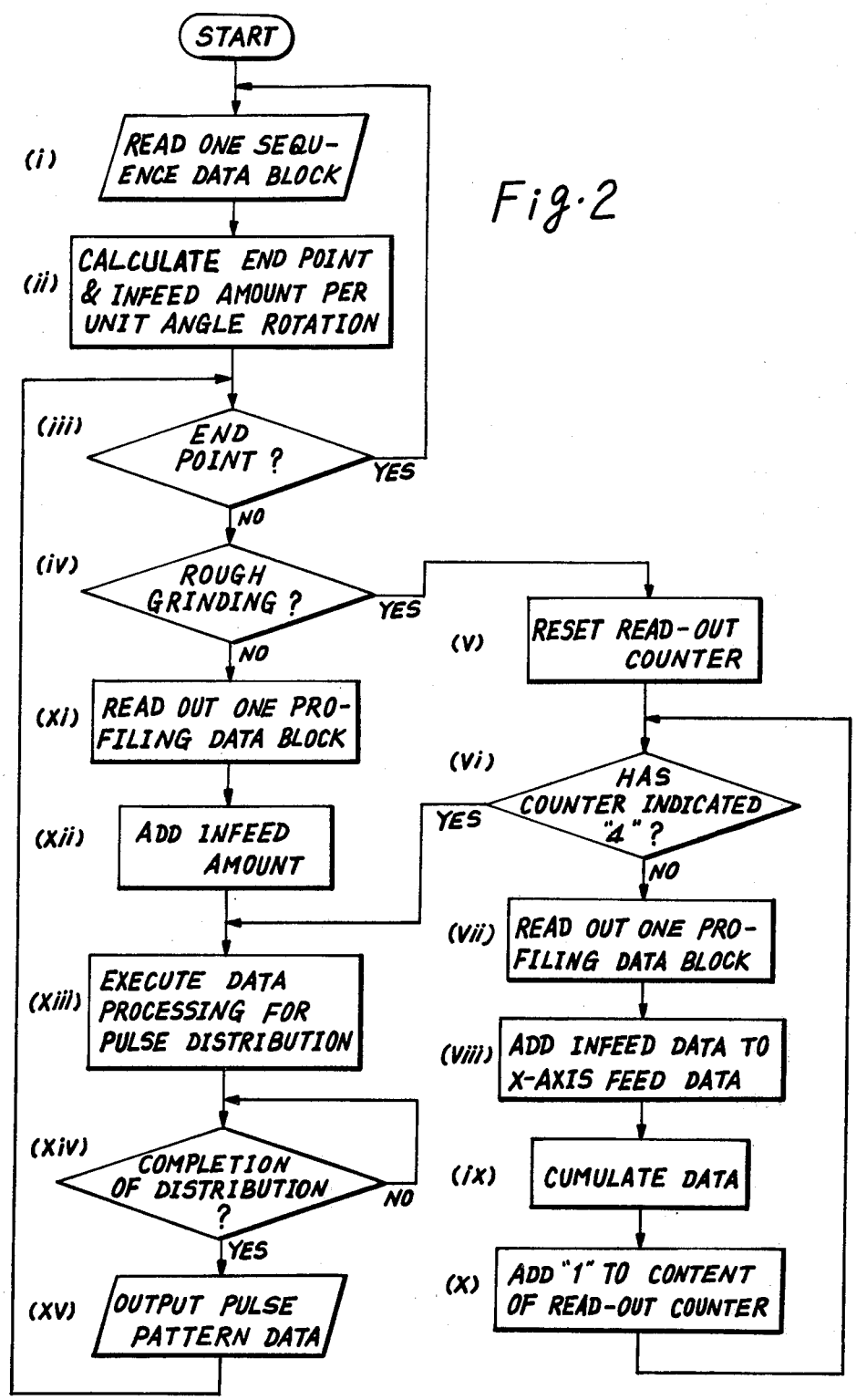
FIG. 2 is a flow chart for explaining the operation of the numerical controller.

FIG. 2 shows a flow chart for explaining the operation of the numerical controller 30. A step (i) involves reading one of the data blocks of the sequence program recorded on the sequence tape 33, and a step (ii) involves calculating from data of the one block read in the step (i), an end point in a pulse distribution operation according to the read one data block and an infeed amount of the tool slide 20 per the incremental unit rotation of the work spindle 13. The end point in the pulse distribution operation is defined by a total rotational amount of the work spindle 13 that is calculated from a total tool infeed amount and a tool infeed rate per work spindle revolution. For example, where like the first data block in TABLE 2, the read one data includes the total tool infeed amount of 20000 pulses and the tool infeed rate per work spindle revolution of 1000 pulses, the end point in the pulse distribution operation is defined as such a point that the work spindle 13 completes 20 revolutions. The infeed amount per the incremental unit rotation is calculated from the tool infeed amount per work spindle revolution, and a rotational angle per the incremental unit rotation of the work spindle 13 and indicates 1000/3600 pulse where the infeed amount per work spindle revolution is 1000 pulses and where the rotational angle per the incremental unit rotation is 0.1 degree (accordingly, the resolution SM rotation of the work spindle 13 being 0.01 degree). A step (iii) involves judging whether or not the end point has been attained, by checking the total rotational amount of the work spindle 13 in the pulse distribution operation according to the read one data block of the feed sequence program. If the attainment to the end point is ascertained a return is made to the step (i) wherein data reading is carried out with the successive one of the data blocks of the sequence program.

A step (iv) involves judging whether the workpiece $\overline{w}$ is in the rough grinding or not. In this particular embodiment, when 5 r.p.m. or more is designated in one data block of the sequence program read in the step (i), it is ascertained that the workpiece $\overline{w}$ is in the rough grinding. The routine is advanced either to a step (v) if such is ascertained or to a step (xi) if such is not ascertained.

Steps (v)–(x) are provided for successively reading out four data blocks of the profiling program which is being stored in the memory device 31 and for adding an infeed amount through which the tool slide 20 is to be infed during a profiling operation according to the four data blocks, to data included in the four data blocks. The step (v) involves resetting a read-out counter, not shown, provided in the data processor 29 in advance of the initiation of data reading-out, and the step (vi) involves judging whether or not the content of the read-out counter has reached "4". At the initiation of the data reading-out, the routine is advanced to the step (vii) because of the read-out counter having been reset to indicate zero. The step (vii) involves reading out one of the data blocks of the profiling program from the memory device 31, and in the step (viii), data or a feed amount included in the read-out one data block is added to the infeed amount which was calculated in the step (ii), whereby there can be obtained a total feed amount through which the tool slide 20 is to be fed during a pulse distribution operation executed in accordance with the read-out one data block. The step (ix) involves accumulating the total feed amount, obtained by the addition, and the incremental unit rotational amount for the work spindle 13 into a predetermined storage area prepared in the memory device 31. Therefore, by repeatedly executing the steps (vii)–(ix), the total feed amounts and the incremental unit rotational amounts are respectively accumulated in the predetermined storage area.

The step (x) involves incrementing the content of the read-out counter by one and is executed each time the execution of the step (ix) is completed. Thus, when the execution of the steps (vii)–(ix) is repeated four times with the result that the total feed amounts and the incremental unit rotational amounts both for four data blocks of the profiling program are respectively accumulated in the predetermined storage area, the read-out counter is caused to indicate "4", which is checked in the step (vi). If it is ascertained in the step (vi) that the content of the read-out counter has become "4", the routine is advanced to a step (xiii), in which data processing steps for pulse distribution are carried out.

Steps (xi) and (xii) are executed in each of the fine grinding and the finish grinding operations for effecting the reading-out of a data block of the profiling program and the addition of the infeed amount per the incremental unit rotation to data included in the read-out data block. In the step (xi), one data block of the profiling program is read out from the memory device 31, and in the step (xii), the infeed amount per the incremental unit rotation which was calculated in the step (ii) is added to data on a tool feed amount of the one data block read out in the step (xi). After the reading-out of one data block of the profiling program and the addition of the tool infeed amount is performed in this manner, the routine is advanced, as is the case in the rough grinding, to the step (xiii), wherein the data processing steps for pulse distribution are then executed.

Figure 3:
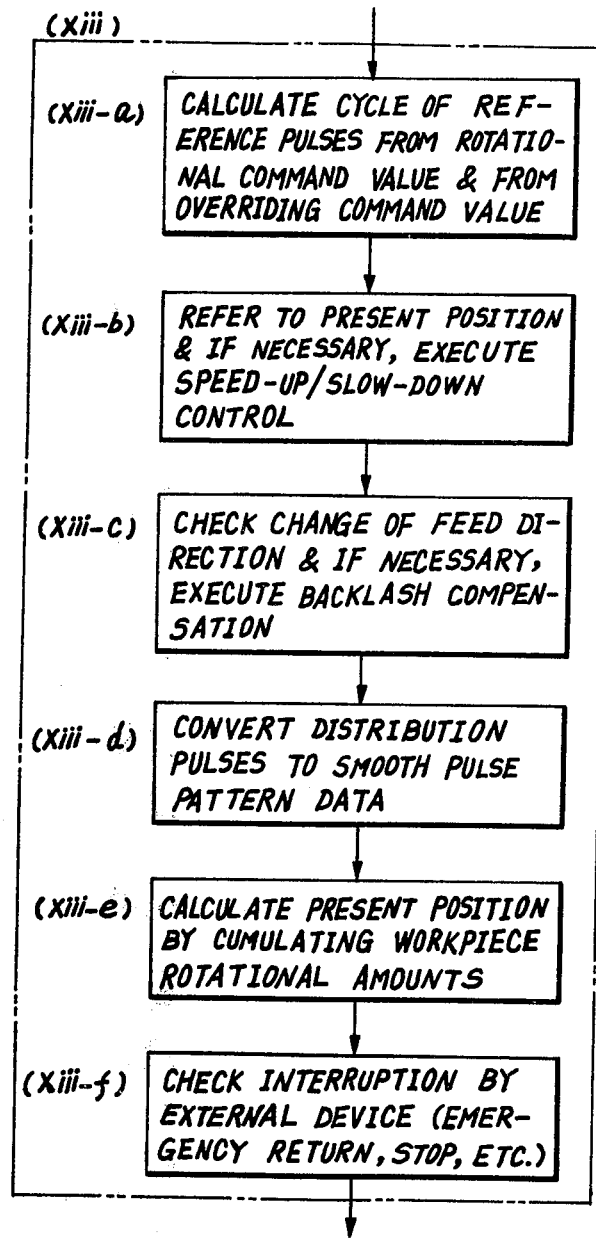
FIG. 3 is a flow chart illustrative of the detail of a step (xiii) shown in FIG. 2.

In a step (xiii), various data processing sub-steps such as, typically, an arithmetic operation for calculating a generation cycle of the reference pulses SP are executed as noted from FIG. 3. First, in a step (xiii-a), the generation cycle of the reference pulses SP is calculated based upon the work spindle rotational speed, designated in each data block of the sequence program, and a feed rate overriding instructing value. In a step (xiii-b), a present position in each pulse distribution operation is searched by checking a rotational amount that the work spindle 13 has rotated prior to the search in the distribution operation, and if the searched present position is in a rotational area within which a speed-up control or a slow-down control is required, the generation cycle of the reference pulses SP is changed. In a step (xiii-c) for a backlash compensation, a check is made of whether the direction in which the tool slide 20 is to be moved has been changed or not, and if such change is ascertained, the accumulated feed amount or the total feed amount of the tool slide 20 which was calculated in the step (ix) or in the step (xii) is adjusted by backlash compensation data. A step (xiii-d) involves executing data processing for pulse interpolation in a known method so as to provide pulse pattern data to be preset in the shift register 36. In this step, the data processing for pulse interpolation is executed based upon data that was obtained in the step (ix) or in the step (xii) while, based upon the results of the data processing, parts of the pulse pattern data of feed pulses to be distributed to the servomotor 23 are successively made and stored in a predetermined pattern storage area. Further, a step (xiii-e) involves accumulating the rotational amount that the work spindle 13 has rotated in accordance with each data block of the sequence program, so as to calculate a new present position in each pulse distribution operation and storing the new present position in a present position register, not shown, provided in the data processor 29. A step (xiii-f) is provided for checking whether any one of control switches such as a return instruction switch and an emergency stop switch is pushed or not and whether any other interruption is given or not.

Upon completion of the foregoing data processing directed chiefly for pulse interpolation, the routine is advanced to a step (xiv) to judge whether the pulse distribution operation according to the pulse pattern data that was calculated in the previous data processing cycle has been completed or not. This judging is made by detecting the presence of the distribution completion signal DFS delivered from the preset counter 35, and if the pulse distribution operation has been not yet completed, the routine is caused to dwell or wait in the step (xiv) until the completion of the pulse distribution operation and to then advance to the step (xv) upon completion of the pulse distribution operation. A step (xv) involves applying to the shift register 36 the pulse pattern data calculated in the step (xiii) as well as presetting in the preset counter 35 the incremental unit rotational amount included in each data block of the profiling program or the sum of the incremental unit rotational amounts which is obtained in the step (ix), and a pulse distribution operation according to new data is initiated with the execution of the step (xv). After the step (xv), a return is made to the step (iii), so that the foregoing data processings are repeated through the steps (iii)–(xv). When the tool slick 20 has been infed the total infeed amount so as to reach the end point, such is ascertained in the step (iii) and a return is then made to the step (i), so that a grinding operation according to a successive data block of the sequence program is then performed.

The entire operation of the numerical controller 30 will be described hereinafter. When numerical control is initiated by the depression of a start push button switch (not shown), numerical control data "S100x-20000 F1000" contained in the first data block of the sequence program is read in step (i). The control data of the first data block is that for a rough grinding, from which an end point in a pulse distribution operation and an infeed amount of the tool slide 20 per the incremental unit rotation of the work spindle 13 are calculated in step (ii). As mentioned previously, the end point in the pulse distribution operation for the rough grinding is defined by the work spindle 13 completing twenty (20) revolutions and the infeed amount per the incremental unit rotation is 1000/3600 pulse. Upon termination of such arithmetic operation, the routine is advanced to the step (iii) to judge whether or not the end point has been attained, and is then advanced to the step (iv) because the end point has not yet been attained. In the step (iv), a checking of whether the work spindle rotational speed included in the first data block read in the step (i) is designated to be more than 5 r.p.m. or not is made to judge whether the workpiece is in the rough grinding. In this case, since the work spindle rotational speed is designated to be 10 r.p.m., it is ascertained that the workpiece $\overline{w}$ is in the rough grinding, and the routine is advanced to the step (v).

In the step (v), the read-out counter (not shown) is reset prior to the read-out of four data blocks of the profiling program, and in the step (vi), a judgement is made as to whether or not the read-out of the four data blocks has been completed, by checking whether the content of the read-out counter indicates "4". At this time, since the read-out counter has been reset to indicate zero, no completion is ascertained with the read-out of the four data blocks, and this causes the routine to advance to the step (vii). Data "C10X + 1" included in the first data block of the profiling program is read out in the step (viii), and in the step (viii), a tool infeed amount per incremental unit work rotation is added to the tool feed amount of the first profiling data block. It is to be noted herein that the total infeed amount per the incremental unit rotation in this particular instance is 1000/3600 pulse and is less than one pulse, and that the data processor 29 is programmed to accumulate the tool infeed amount per incremental unit rotation and to add the accumulated value to the tool feed amount of a data block of the profiling program when the cumulated value reaches one (1). Accordingly, no addition is made of the infeed amount per incremental unit rotation to the feed amount, and in the step (ix), the data read-out in the step (vii) is stored in the predetermined storage area as is. The routine is advanced to the step (x) to increment by one the content of the read-out counter and then, is returned to the step (v). When the foregoing operation is repeated four times, data "C40X + 9" which is obtained as a result of adding the tool infeed amount "1" for the four incremental unit rotations to accumulated data "C40X + 8" of the first to fourth data blocks of the profiling program is left stored in the predetermined storage area of the memory device 31, and the content of the read-out counter is advanced to indicate "4".

Such indication by the read-out counter is ascertained in the step (vi), and the routine is advanced to the step (xiii). In this step, data processing steps for feed rate overriding control and speed-up and slow-down controls are executed, and a generation cycle at which the reference pulses SP are to be generated is calculated. Further, the interpolation operation is performed with feed pulses to be distributed to the servomotor 23, while the pulse pattern data to be preset in the shift register 36 is derived. Thereafter, the calculation of a new present position and the checking of an interruption from any external device are successively executed, and the routine is then moved to the step (xiv), wherein a checking is made of whether or not a pulse distribution operation according to pulse pattern data which was calculated in a previous cycle has been completed. Since a distribution operation according to the pulse pattern data which was calculated in this cycle has not yet initiated and the distribution completion signal DCS has been kept delivered from the present counter 35, the completion of the previous pulse distribution operation is ascertained. The routine is then advanced to the step (xv), in which the pulse pattern data that was calculated in the step (xiii) is preset in the shift register 36 and the data "40" for the C-axis of the four data block accumulated data that is being stored in the predetermined storage area of the memory device 31 is preset in the preset counter 35. The pulse distribution operation is then initiated to distribute feed pulses to the servomotors 14 and 23, whereby the rough grinding of the workpiece w is initiated.

After the data presettings into the shift register 36 and the preset counter 35, the routine is returned to the step (iii), from which the foregoing operations are repeated. In the rough grinding, the routine is advanced from the step (iv) to the step (v), after which the readings-out and the accumulations are carried out with profiling data contained in successive four data blocks of the profiling program and an infeed amount is added to the profiling data. The routine is then advanced to the step (xiii) so as to execute the data processing for pulse interpolation. Since the data processing for pulse interpolation in the rough grinding is executed once for four data blocks of the profiling program, time that is taken for the numerical controller 30 according to the present invention to read out profiling data of the four data blocks as well as to process the profiling data for pulse interpolation is shortened to one-third as compared with the time taken for a prior art numerical controller to do so, as indicated in (d) and (e) of FIG. 4. It is therefore possible to increase the pulse distribution speed in rough grinding. In practice, the time taken to read out a data block is sufficiently shorter than that taken to process data of the read-out data block for pulse interpolation, and therefore, by processing profiling data of four data blocks as profiling data of one data block, the pulse distribution speed in rough grinding can be increased four times as fast as that in the prior art numerical controller. This permits the rough grinding of the workpiece $\overline{w}$ to be performed at a high speed and thereby to be completed within a short period of time. In rough grinding, the grinding accuracy is deteriorated due to the fact that each pulse distribution operation is executed based upon the cumulated profiling data of four data blocks. It is, however, to be realized that such deterioration of accuracy in rough grinding does not affect a final profile of the workpiece $\overline{w}$ since the final profile is formed in the fine grinding following the rough grinding.

The rough grinding is performed in the foregoing manner, and when the end point in the pulse distribution operation is attained, such is ascertained in the step (iii), from which a return is then made to the step (i). In this step, there is read data "S10X − 1000F200" for fine grinding that is contained in the second data block of the sequence tape 33. Because the work spindle rotational speed in the fine grinding is designated to be 1 r.p.m. and less than 5 r.p.m., it is ascertained in the step (iv) that the workpiece $\overline{w}$ is not in rough grinding, and the routine is caused to go to the step (xiii) through the steps (xi) and (xii). Accordingly, in the fine grinding, the reading-out and the processing of the profiling data are executed on one data block basis, and a pulse distribution operation therefor is executed also on one data block basis, whereby the workpiece $\overline{w}$ is highly precisely ground in accordance with the series of data blocks of the profiling program. Further, in a successive finish grinding, the reading-out and the processing of the profiling data are executed, like those in the fine grinding, on one data block basis, and this results in further improving the grinding accuracy of the workpiece $\overline{w}$.

Although in the above-described embodiment, a judgement is made to ascertain whether or not the workpiece $\overline{w}$ is in rough grinding by reference to tool spindle rotational speed data which is included in each data block of the sequence tape 33, such a judgement may otherwise be made by reference to tool slide infeed rate data which is contained in each data block of the sequence tape 33. A particular word for instructing the rough grinding may be programed on the sequence tape 33.

Further, although in the above-described embodiment, data blocks of the profiling program are read out four by four in the rough grinding, the number of the data blocks to be read out for processing as one data block may be altered based upon the grinding speed in rough grinding, the processing speed of the data processor 29, etc.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A numerical controller for controlling the machining of a workpiece comprising:
 a first servomechanism coupled to said workpiece and responsive to a first chain of feed pulses for effecting rotation of said workpiece;
 a second servomechanism coupled to a tool slide and responsive to a second chain of feed pulses for effecting a feed movement of said tool slide relative to said workpiece;
 data processing means coupled to said first and second servomechanisms for producing said first and second chains of feed pulses in accordance with a profiling program so as to machine said workpiece to a predetermined oval form in accordance with said profiling program, said data processing means comprising,
 memory means for storing said profiling program composed of a series of data blocks,
 data read-out means for reading out a successive one of said data block from said memory means,
 interpolation processing means for processing profiling data included in said successive one of said data blocks read out from said memory means so as to provide interpolation data in the form of said first and second chains of feed pulses, said second chain of feed pulses to be distributed in connection with said first chain of feed pulses,
 pulse distribution means for applying said first and second chains of said feed pulses respectively to said first and second servomechanisms, respectively,
 means for ascertaining whether or not said workpiece is in a rough machining operation or in a fine machine operation,
 read-out control means for controlling said read-out means to successive read out a predetermined number of data blocks of said series of said data blocks when it is ascertained that said workpiece is in said rough machining operation,
 data accumulating means for accumulating profiling data included in said predetermined number of said data blocks, and
 interpolation control means for controlling said interpolation processing means to provide said interpolation data based upon the accumulated profiling data accumulated by said data accumulating means;
 wherein the number of said predetermined number of data blocks is predetermined such that the amount of time spent by said interpolation processing means during reading and processing of the profiling data included in said predetermined number of data blocks is less than the duration time of the distribution of said first and said second chains of feed pulses derived from said predetermined number of data blocks, whereby uninterrupted workpiece machining is achieved 2. A numerical controller as set forth in claim 1, wherein:
 said profiling data included in each of said series of said data blocks defines an incremental rotational amount of said workpiece and an incremental feed amount of said tool slide; and
 said data accumulating means comprises first means for obtaining respective cumulation values of said incremental rotational amounts and said incremental feed amounts included in said predetermined number of said data blocks.

3. A numerical controller as set forth in claim 2, further comprising:
 a tape reader for reading a machining sequence program composed of a rough machining operation sequence data block and a fine machining sequence data block; and
 said ascertaining means comprising means for referring to a workpiece rotational speed designated in each of said rough and fine machining sequence data blocks, so as to ascertain whether said workpiece is in said rough machining or not.

4. A numerical controller as set forth in claim 3, wherein:
 each of said rough and fine machining sequence data blocks designates a tool infeed amount per workpiece revolution;
 calculating means is provided for calculating a tool infeed amount per workpiece incremental rotation based upon tool infeed amount per workpiece revolution; and
 said data accumulating means comprises means for adding said tool infeed amount per workpiece incremental rotation to said incremental feed amount of said tool slide included in each of said predetermined number of said data blocks.

5. A numerical controller as set forth in claim 4, wherein:
 said data read-out means, said interpolation processing means, said ascertaining means, said read-out control means, said data accumulating means, said interpolation control means and said calculating means comprises a general purpose digital computer.

* * * * *